Feb. 17, 1970 P. GRAHAM 3,495,676
SAFE VEHICLE BODY
Filed Oct. 16, 1967 2 Sheets-Sheet 1
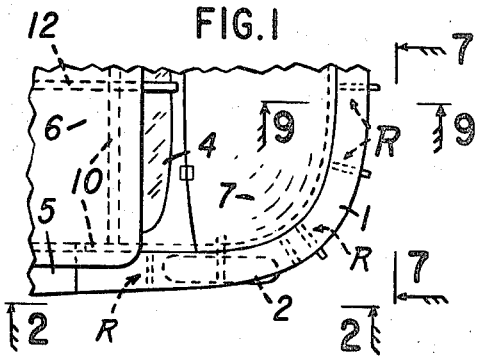
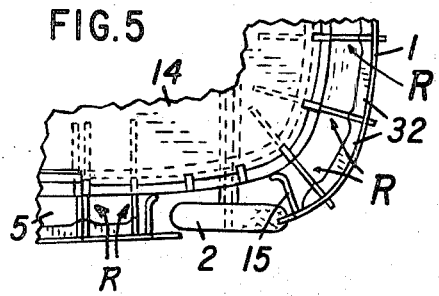
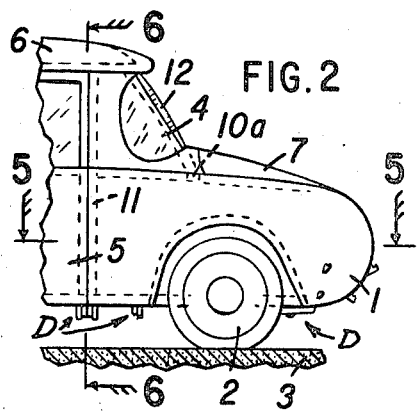
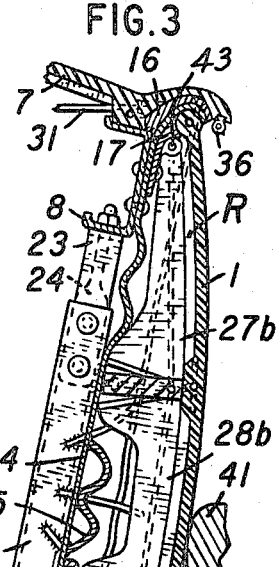
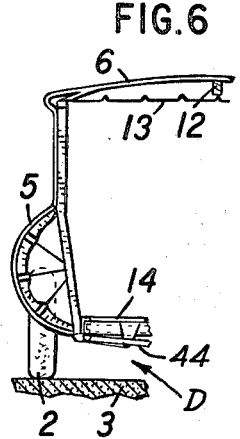
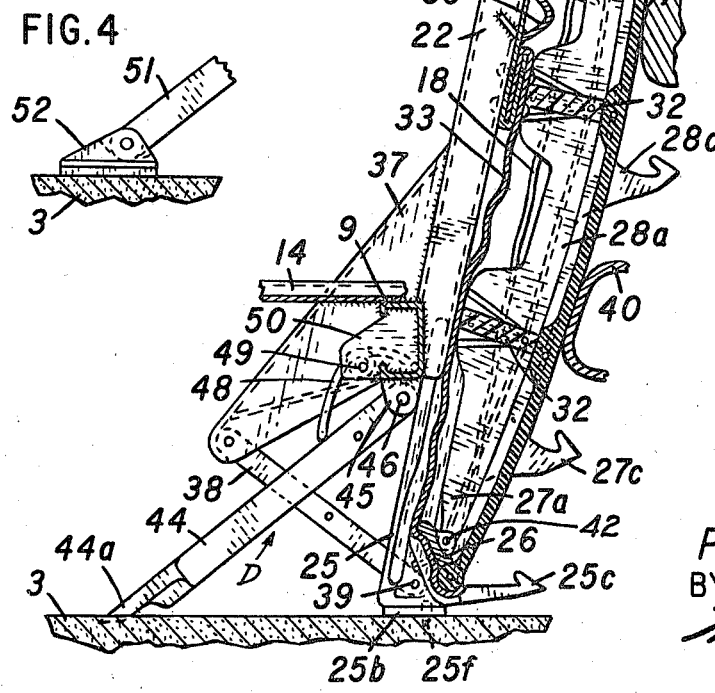
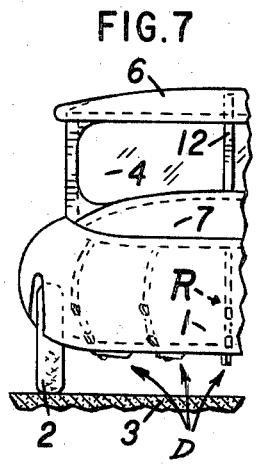
INVENTOR.
PHILLIP GRAHAM
BY
ATTORNEY

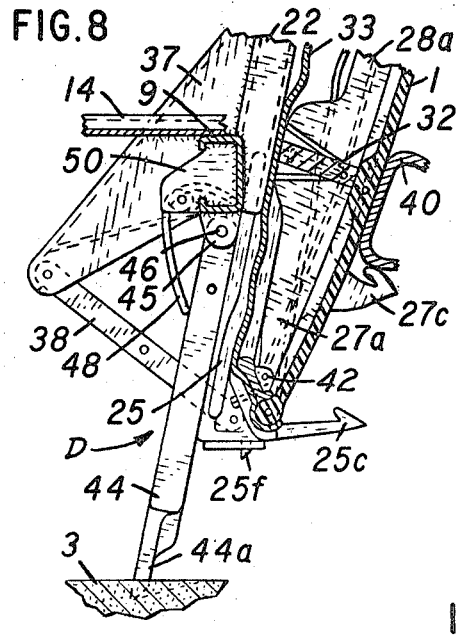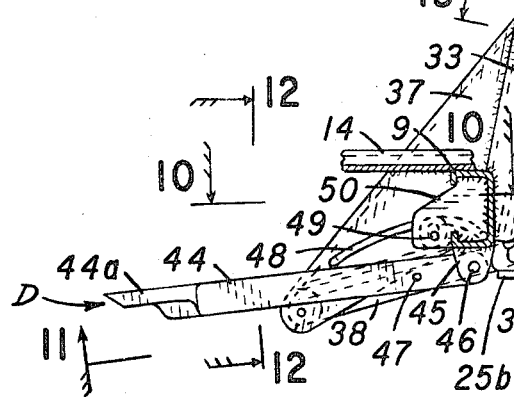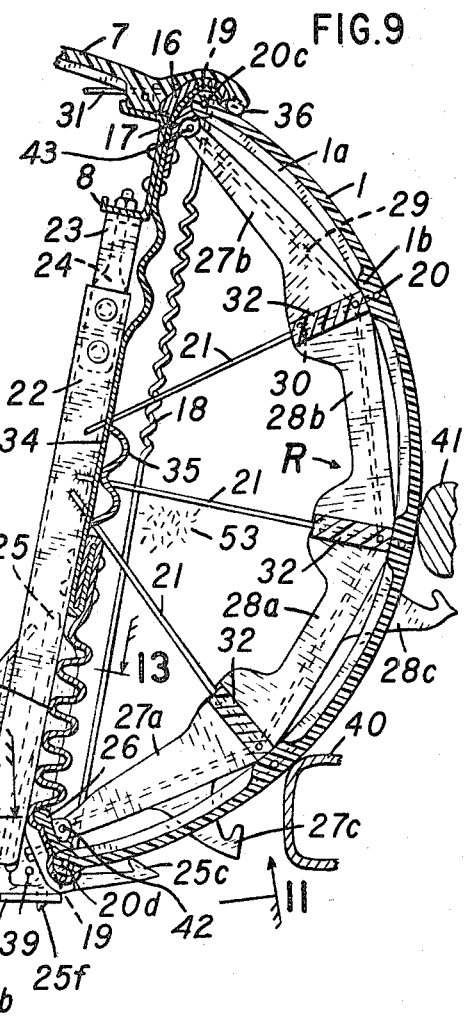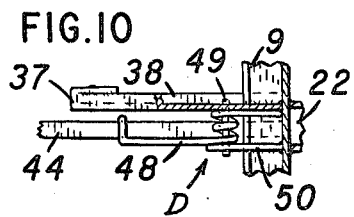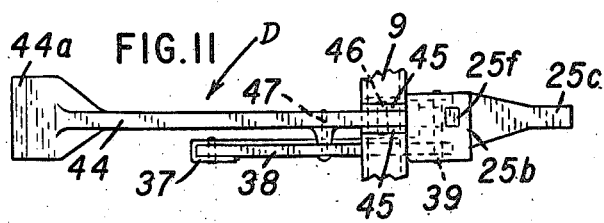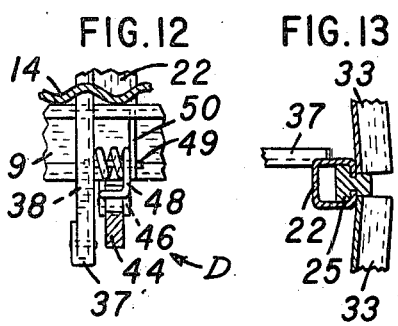
INVENTOR.
PHILLIP GRAHAM
ATTORNEY United States Patent Office 3,495,676
Patented Feb. 17, 1970

3,495,676
SAFE VEHICLE BODY
Phillip Graham, 2825 Glenmore Ave.,
Pittsburgh, Pa. 15216
Continuation-in-part of application Ser. No. 457,627,
May 21, 1965. This application Oct. 16, 1967, Ser.
No. 675,592
Int. Cl. B60r 19/00, 21/14; B60t 7/00
U.S. Cl. 180—93                                      13 Claims

ABSTRACT OF THE DISCLOSURE

The invention relates to the incorporation, in a safe automobile body having a vertically bowed yieldable shell or bumper portion, a pivotal mounted diagonal stop brace means that pivots downwardly and grips the roadway in response to a heavier automobile's collision impact force flattening a portion of the bumper, so as to divert much of a great momentum force of the opposing automobile diagonally into the roadway, whereby much of the great force by-passes the occupant's compartment. The diagonal stop brace means would be restrained from pivoting to an extent after the initial impact contact with the roadway, by the weight of the safe body portion above it and by the weight of engaging end of the opposing vehicle that would tend to interlock with it. After the initial impact, the heavier opposing vehicle would tend to move forwardly by causing the diagonal brace stop to pivit, which action would cause the impacted end of the safe vehicle to rise and in rising it would tend to lift, then to tear away the front of the heavier vehilce, which action would cause the impacted end of the safe vehicle to be forced upwardly into a position higher than the position of the end of the opposing vehicle, thus allowing the heavier opposing vehicle to move forwardly by wedging under and carrying the light automobile, rather than to crush the light automobile. This invention is an improvement over the safe vehicle bodies described in my Patent No. 3,219,384 and my earlier related patents, as the pivotal stop brace coacts with other portions of the bumper portion of the safe body, to safely cushion and divert collision impact forces in progressive steps.

This invention is a continuation-in-part of my co-pending application Ser. No. 457,627, filed May 21, 1965, entitled Safe Vehicle Body, now Patent No. 3,356,175. Applicant also claims rights to an earlier filing date to common subject matter that is described in the present application, which was also described in his applications Ser. No. 226,623, filed Sept. 27, 1962, entitled Safe Vehicle Body, now Patent No. 3,219,384; Ser. No. 857,187, filed Dec. 3, 1959, entitled Safe Vehicle Body, now Patent No. 3,056,627; Ser. No. 721,150, filed Mar. 13, 1958, entitled Curved Vehicle Bumper, now Patent No. 3,056,462; Ser. No. 557,938, filed Jan. 9, 1956, entitled Safe Conveyance Body, now Patent No. 2,916,324, and application Ser. No. 449,695, filed Aug. 13, 1954, entitled Curved Barrier, now Patent No. 2,826,788. The co-pending application Ser. No. 457,627 is a continuation-in-part of application Ser. No. 226,623, application Ser. No. 226,623 is a continuation-in-part of applications Ser. No. 857,187 and Ser. No. 721,150; applications Ser. 857,187 and Ser. No. 721,150 are continuation-in-part applications of application Ser. No. 577,938 and application Ser. No. 721,150 was a continuation-in-part of application Ser. No. 449,695, until the continuation-in-part claim was deleted in 1962 when the specification was largely deleted to restrict it to bumpers.

This invention relates to a safe vehicle body, having a pivotal stop brace means that can grip the roadway in response to a collision impact against a bumper portion by a heavier vehicle and brace the safe body against the collision impact of the heavier vehicle to divert much of the heavier vehicle's momentum force diagonally into the roadway. This causes the force to by-pass most of the safe body, thereby restraining the body from being deformed to a critical degree. More particularly, the safe vehicle body is a cushionable automobile body and the like, that has a yieldable bowed shell or bumper portion that can yield by flattening to an extent, during a collision with a heavier vehicle, then divert much impact force into a vertical direction so as to harmlessly absorb it by diverting some of the force into the roadway and by lifting action. The safe body has spike means to snag into a roadway and grappling means to snag into an object that it is in a collision with, to restrain the safe vehicle from caroming.

Bowed bumper portions with pivotal stop brace means may be used effectively on the rear and on the front of a small light-weight automobile. The rear bumper portion would be particularly useful in resisting rear end collisions that occur frequently on divided highways. The front bumper portion has safety advantages that outweigh the possibilities that the grappling means would not restrain the vehicle from hurdling a highway guard rail or the like. The safe vehicle body includes means that would allow the use of economical light-weight automobiles, including electrically propelled automobiles, with a much higher degree of safety. At present, there are numerous automobiles that weigh only about one-third as much as many larger automobiles. Collisions between the heavy automobiles and the lighter automobiles usually results in the lighter automobile being badly damaged and its occupants being injured. Operators of heavy automobiles frequently violate the law and infringe on the rights of the occupants of light-weight automobiles, by illegally taking a right-of-way, and by tailgating. A light-weight automobile having the present safe body, would furnish more protection to its occupants and it would be a deterrent to reckless operators of heavy automobiles, since the light-weight automobiles would sustain less damage than usual, while the heavier automobile could sustain much more damage and there would be greater possibility of injury to occupants of the heavier automobile. Conventional automobiles are reinforced to enable stunt drivers to safely roll them over and the like. Therefore, a small light-weight automobile can be built strong enough to resist being critically damaged when it is propelled or rolled over when a heavier automobile is forced under it, whereas such a small automobile cannot safely absorb a direct collision from an automobile that is three times its weight. While this type of safe vehicle body would be most useful for vehicles, such as automobiles, it may also be used for other vehicles.

There is old art in Patent No. 2,959,251 and in Patent No. 2,843,224 which is related to it, relating to an auxiliary rear end bumper having a slidable plunger type of shaft. The shaft has a diagonal mounting of fixed angularity to divert a collision impact from another automobile into a roadway. These old auxiliary bumpers are deemed to lack the means to make them work effectively. They are deemed to be hazardous and likely to cause many accidents which would not otherwise occur. The old auxiliary bumper means is deemed to be inoperative, in general, when applied as shown on a conventional modern automobile, to furnish protection from another conventional modern auto mobiel that collides with it. The old auxiliary bumper means does not coact with its conventional modern automobile that collides with it. The old bumper helps to support the auxiliary bumper. A spiked or friction shoe at the lower end of the diagonal plunger shaft engages the roadway when the upper end of the diagonal plunger shaft is impacted by another vehicle. The shaft is slanted at about seventeen degrees, which is such a slight angle with respect to the roadway, so that the shaft or the shaft support would tend to deform as the result of the impact force against the roadway. Thus, the spiked or friction shoe would tend to lightly slide over the roadway, without bearing intensely against it, thereby diverting or absorbing very little of the impact force. The shaft and its support cannot be made strong enough to effectively resist the force so as to prevent the deformation, except by making the parts so large that they would be non-feasible because of excessive size, weight and cost. The spiked or friction shoe is mounted so close to the roadway surface that the shoe would hazardously engage the roadway and end to cause an accident, when the automobile springs are deflected by the vehicle being fully loaded and when the vehicle springs deflect when the vehicle passes over a bump in the highway. The spiked or friction shoe would also hazardously engage the roadway when a fully loaded vehicle is lowered when an adjacent tire is blown out. The spiked or friction shoe would have to be retracted three or four times as far above the roadway surface as shown in the patents, to allow for deflection and the like. If the friction shoe were to be retracted three or four times as high, the contact plate on the upper end of the diagonal shaft would be so far out from, and higher than the automobile's conventional bumper that it would constitute a hazard, since the upper end would be positioned above the bumper of an opposing automobile, since all automobiles have their bumpers at substantially the same height. Therefore, the thin weak sheet metal or the delicate grillwork of the opposing vehicle would strike the contact plate, the sheet metal and/or grill-work would deform easily, without transmitting sufficient momentum force of the opposing vehicle into the diagonal shaft to deflect a cushioning spring means or hydraulic means on the auxiliary bumper. Thus the auxiliary bumper would be inoperative in the intent to drive the spiked or friction shoe into engagement with the roadway, and the auxiliary bumper would needlessly cause costly damage to the delicate grill-work and the like of the opposing vehicle. The required outward projection of the old auxiliary bumpers would be two or three feet past the conventional bumper. Therefore, the long projection would be objectionably hazardous since other vehicles would be greatly damaged when the auxiliary bumper's contact plates strike them during parking operations or when the other vehicles strike the contact plates while parking.

These old auxiliary bumpers cannot be made feasible by decreasing the angularity of the diagonal plunger shaft, because slighter angularity would increase the tendency of the lower end of the diagonal shaft to bend, thus a hard surfaced roadway would resist penetration of the spiked friction shoe. If the angularity of the bumper shaft is reduced so an opposing automobile's bumper effectively engages it, the shaft would have to project out further from the conventional bumper to which it is attached, thus the long projection would be hazardous and illegal projection. Such a long projection would necessarily be so large and heavy to prevent it from bending when impacted, therefore, would not be feasible.

These old auxiliary bumpers cannot be made operative by increasing the degree of angularity of the diagonal shaft. Such an increase in the shaft's angularity would move the contact plate further above the opposing bumper and it would also position the plunger shaft so that it would require far less force to bend the upper portion rather than to plunge it when an opposing vehicle strikes it.

Since the old auxiliary bumper means has a fixed angular position, the vehicle would tend to rise and raise its spiked friction shoe away from the roadway when an opposing vehicle forces the impacted end of the auxiliary bumpered vehicle to rise. When an opposing vehicle tends to over-ride and push the impacted rear end of the vehicle downwardly, the movement would tend to flatten the angularity of the diagonal shaft and thus increase the tendency to bend the lower portion of the shaft.

The following are some of the reasons why the bumper means of the present invention has feasible means to cause it to act effectively, unlike the old auxiliary bumper means described in Patents No. 2,959,251 and No. 2,843,224. The pivotal stop brace is retracted high enough so that it cannot snag a roadway when the vehicle body deflects when it is overloaded or the like. The pivotal stop brace is lowered in response to an impact on a bowed bumper shell that is shaped similar to a conventional body shell, therefore, it does not objectionally project outwardly as does the old auxiliary bumper means. After an impact releases the pivotal stop brace from a retracted position, the brace constantly and securely bears against the roadway, even while the safe body deflects or bounces upwardly to an extent, as the pivotal stop brace pivots to maintain contact with the roadway. The pivotal stop brace is relatively short and slight, yet strong enough to transmit a great impact force into the roadway, thus it would not be objectionable in length, weight or bulk. While the pivotal stop brace remains securely engaged to the roadway, it can pivot to cause it to act as a jack to raise the impacted end of the safe automobiles so the heavier opposing automobile can force itself to wedge underneath the safe automobile to an extent.

The safe vehicle body described in the present application is an improvement over the safe vehicle body described in my co-pending application Ser. No. 457,627. The improved body has a pivotal stop brace that can divert impact, from another vehicle diagonally into a roadway and the brace can pivot to raise the impacted end of the safe vehicle, so as to allow a heavier automobile to wedge its way underneath it.

The safe body with front bumper pivotal stop means would be particularly useful for a small automobile that has its occupant's compartment close to the front of the vehicle. Such an automobile has such a short depth of allowable deformation that the occupant must be restrained with a higher degree of restraining means than the common seat belt. Such restraining means are described in my Patents No. 3,262,716, No. 3,129,017, No. 2,977,135, No. 2,827,305, and No. 2,826,788. These patents describe vehicle occupant safety barriers that cushion and restrain the occupants from being hurled by momentum against the rigid portions of the interior of the vehicle.

An object of my invention is to provide a safe vehicle body having a bumper-like portion that will yield by flattening to an extent under a collision impact to cushion and divert collision impacts against it. The vehicle body includes a pivotal diagonal stop brace means that is forced to pivot down to the roadway in response to the impact action, to cause the brace to grip the roadway to provide a means to diagonally divert the momentum of an opposing heavy vehicle into the roadway and to thus stop or restrain the heavy vehicle. The stop brace includes pivoting means to raise the impacted end of the body, to allow a heavier automobile to wedge its way under the impacted end of the safe body.

Other objects of my invention will become more apparent from the following description taken with the accompanying drawings wherein:

FIG. 1 is a fragmentary plan view showing a portion of a safe automobile;

FIG. 2 is a fragmentary elevational view taken along line 2—2 of FIG. 1;

FIG. 3 is an enlarged fragmentary sectional elevational view, taken through an end bumper portion of the safe automobile, showing the bumper portion being flattened during a collision;

FIG. 4 is a fragmentary elevational view showing details of a bumper portion modification having a friction shoe on a diagonal stop brace;

FIG. 5 is a fragmentary sectional view taken along line 5—5 of FIG. 2;

FIG. 6 is a fragmentary sectional view taken along line 6—6 of FIG. 2;

FIG. 7 is a fragmentary elevational view taken along line 7—7 of FIG. 1;

FIG. 8 is a fragmentary sectional elevation that is similar to FIG. 3, but showing the stop brace raising the impacted end of the vehicle;

FIG. 9 is an enlarged fragmentary sectional elevational view taken along line 9—9 of FIG. 1, the view differing from FIG. 3 by showing bumper portions as they are positioned before a collision;

FIG. 10 is a fragmentary sectional view taken along line 10—10 of FIG. 9;

FIG 11 is a fragmentary view taken along line 11—11 of FIG. 9;

FIG. 12 is a fragmentary sectional view taken along line 12—12 of FIG. 9; and

FIG 13 is a fragmentary sectional view taken along line 13—13 of FIG. 9.

The safe vehicle body is illustrated as an automobile body. My Patent No. 2,916,324 describes most of the safe body in detail.

A quarter portion of an automobile is shown, as a highly functional automobile body may be substantially symmetrical about its longitudinal axis and its transverse axis. The automobile illustrated in the drawings has a slightly resilient yieldable body shell. Broadly stated, the automobile body in accordance with the present invention consists of bowed shell portions with yieldable ties across the chords of the bows. The shell may be made of such materials as metal, plastic and fiber glass. Collision impacts cause the bowed shells to yield by flattening partially, and the yieldable ties to yield by stretching until the forces are absorbed, or diverted.

The shell of the body is confined to maintain highly efficient arched or bowed shapes. The bowed shapes act as arched compression members that can yield and flatten partially in cushioning collision impacts. While the shell is flattening partially, the collision impact force is diverted and spread over a greater portion of the body so the force can be resisted by the large portion of the body that is brought into play, to thus gradually absorb the force. There are yieldable spring ties across the chords of the bowed shell sections that yield to an extent and absorb much of the violent impact force. There are ribs that can yieldably flatten as they help to maintain arched shapes of the shell portions as they partially flatten. The body members are shaped and combined so as to provide continuity to the automobile body so the body as a unit can act to cushion and resist collision impacts. The ends and the sides of the automobile body have the highly yieldable and resilient features to cause cushioning actions from collision impacts, also to a more limited degree, these features are incorporated into horizontal cover portions, which may be the roof, the hood, and the trunk lid. The front and rear of the automobile body may be of substantially identical structural features, since head-on collisions and rear-end collisions of intense magnitude are frequent occurrences. The horizontal cover portions that include the hood, trunk lid and roof, yield to cushion when the automobile rolls over. The overhanging edge of the roof is resilient, which allows it to yield when it is impacted.

The yielding of the body, in general, is controlled to an extent so as to prevent severe deformation of the occupant's compartment. Thus the safe body is expendable to protectively cushion its occupants.

A bowed shell or skin 1 has a large middle ordinate which provides a long distance in which the shell can flatten to yield and cushion an impact force. The vehicle has conventional wheel means 2. The wheel means 2 bears on a roadway 3. An end window 4 is suitably mounted. A door 5 has a yieldable shell. The body includes a roof shell 6. A horizontal shell 7 may be a trunk lid or a hood. Metal channels 8 and 9 are arched in length. Rigid members 10 support the roof shell 6. Members 10 are supported by post means 11. The roof may have a yieldable center rib 12. The rib 12 engages a transverse member 10a. A crimped yieldable sheet 13 may be used to form a ceiling. A floor 14 or a motor (not shown) stiffens the chassis channel 9, restraining the channel from bending as the result of the impact against the shell 1. Flexible mud guard means 15 may be made of highly elastic plastic.

Typical details of the bumper portion are shown clearly in FIG. 9. A retainer bar 16 is welded to the top of the channel 8. A retainer bar 17 is riveted to the web of the channel 8. A wire spring tie 18 forms a resilient tie across the chord line of the shell 1. Wire fasteners 19 are used to fasten the top and bottom edges of the shell 1. The shell 1 may have a wire grid 20 embedded in it, with the wires positioned horizontally and vertically. The tie 18 is fastened close to the reinforcing wire 20c and 20d in the bulb-like edgings of the shell 1. The wire 20d is spirally coiled to allow it to yield locally. Spoke-like radial ties 21 may be used to restrain the shell 1 from bulging outwardly.

The shell 1 may be reinforced with typical vertical yieldable ribs R. Ribs R are yieldable bumper shaft means. At each rib R, a tie-post 22 is welded to the channel 9. The top of the tie-post 22 is attached to a horse-shoe shaped resilient steel bar 23 and a limit bolt 24. The bolt 24 engages the channel 8. This type of tie and support allows the shell 7 to yield and cushion the shock of an impact on its top surface during roll-overs. The bar 23 and the bolt 24 prevent the channel 8 and adjoining parts from rising when an impact on the side of the shell 1 tends to raise the impacted end of the body. At each rib R, a sliding retainer 25 takes the thrust from the lower edge of the shell 1 and slides down a tie-post 22, as the shell 1 is spread in flattening under an impact. Retainer bars 26 are short members that are fastened to the retainers 25. A bar 26 bears against the lower bulb-like edging of the shell 1. Retainer shoes 25b may be fastened to the retainer 25 to provide a slightly yieldable surface which can evenly bear against the roadway 3.

Ribs 27a, 27b, 28a and 28b form a typical yieldable rib R. Ribs R may be used to maintain an arched shape to the shell 1 during a collison, until the arched, bowed shape is flattenen just short of the state of collapsing. There is a wire grid system 29 that links the ribs 27a, 27b, 28a and 28b together. These wires act as hinges when the shell area bearing against them flattens during a collision. Rib 27a pivotally engages the pin 42 on the bar 26 to provide a yieldable bearing means. The rib 27b pivotally engages the pin 43 on the bar 17, to provide a fixed pivotal bearing means. Offset rings 30 on the wires 21 tend to hold a rib R close to the shell 1.

A yieldable tie means 31 may be used to tie across the bow of the panel 7. The panel 7 is kept securely latched in position. The panel 7 is keyed to the top of channel 8.

Horizontal ribs 32 may be used effectively to distribute the impact. The ribs 32 would yield with the shell 1 and restrain the shell from buckling. A rib 32 would spread impact force against it into the adjacent ribs R. The ribs 32 may be omitted in a safe body of limited strength. The shell 1 may have rib-like portions 1a and 1b to stiffen it and to provide additional thickness around the wire 20.

Corrugated tie sheets 33 may be made of high carbon steel to allow them to act as springs. Sheets 33 are shown as short members spanning between retainers 25. A tie sheet 34 is fastened to the channel 8, tie-posts 22, and to the sheets 33. The bottom of each sheet 33 securely engages the lower edging of the shell 1. The upper portion of sheet 34 has two corrugations that may yield downwardly during a roll-over. Sheet 34 may be highly resilient. Sheet 35 is a corrugated stiffener that is fastened to the tie sheet 34. An elastic seal 36 is attached to the shell 6.

Brackets 37 are welded to the channel 9. Pivotal link brace means 38 are pivotally engaged to the brackets 37 and to the retainers 25. Pin means 39 holds the braces 38 to the retainers 25. Braces 38 restrain the lower portion of the shell 1, from buckling when the shell is flattened to an extent. My Patent No. 3,056,627, fully describes the pivotal link bracing means.

When the safe vehicle collides with an object 40 or an object 41, the portion of the shell 1 and the rib means R that are adjacent to the impact, flattens to an extent as shown in FIG. 3. The objects 40 and 41 may be portions of an opposing vehicle or be fixed objects.

The bowed shell 1 is tilted to allow impact against it to cause effective flattening action, when an object 40, such as an opposing bumper, strikes low against the shell.

At each rib R, a stop means D is incorporated into the vehicle body. A stop means D has means to diagonally divert impact force from an opposing heavier vehicle into the roadway and to raise the impacted portion of the safe vehicle body. Each stop D includes a pivotal stop brace 44, which is pivotally mounted to chassis pin plates 45 with a pin 46, to allow the brace 44 to pivot downwardly from a retracted position shown in FIG. 9 to a diagonal protective position shown in FIG. 3. The pin plates 45 are welded to the channel 9. Each brace 44 is kept in a retracted position by means of a restraining or tripping means, such as the shear pin 47 that joins the brace to a link 38. The pin 47 is weak and expendable, as it shears easily to trip the brace 44, when the link 38 is forced downwardly by the flattening of the ribs R and the shell 1. A coiled spring 48, or another type of power means, forces the stop brace 44 to quickly pivot downwardly against the roadway 3. The spring 48 is kept in position by the pin 49. A pin 49 engages a bracket 37 and a pin plate 50. The pin plate 50 is welded to the channel 9. The spring 48 tends to keep the brace 44 bearing securely against the roadway 3, including maintaining secure bearing while the stop brace 44 pivots when the vehicle body deflects or rises to an extent.

Other types of power means, such as hydraulic and pneumatic cylinders (not shown), may be used in place of the spring 48. The stop brace 44 may be made of strong steel. The free end of the stop brace 44 has a chisel-like point 44a so that it can penetrate the roadway 3. When the vehicle is to be used primarily on dirt roads or the like, a stop brace 51 with a pivotally mounted friction shoe 52, shown in FIG. 4, would be used instead of the chisel pointed brace 44. The chisel point 44a would penetrate soft surfaced roadway too easily, thus it could not transmit a great momentum force into the roadway. The broad bearing surface of the shoe 52 would allow a considerable momentum force to be diverted into the roadway. although a much heavier opposing vehicle would tend to cause the shoe 52 to slide to an extent. The stop brace 51 would be used where governing bodies would not allow the use of the chisel pointed brace 44, because the chisel point would gouge a highway.

Ribs 27a and 28a may have grappling hooks 27c and 28c. There may be a grappling hook-like projection 25c on each retainer 25. When the shell 1 flattens, the grappling hooks tend to catch hold to plate and cable types of guard rails and the like, to prevent the vehicle from leaping over the guard. The grappling hooks would also tend to grapple with an opposing vehicle that collides with the safe vehicle. The grappling hooks would be omitted on the sides of the vehicle. Each retainer 25 may have a spike or offset 25f. A spike 25f would tend to be driven into the roadway 3 when the adjacent portion of the shell 1 is flattened. My Patent No. 3,219,384, fully describes the grappling hooks and spike means.

Light weight and highly compressible insulation 53, such as foam plastic or fiberglass, may be placed in the space between the shell 1 and the sheets at its chord line. The insulation 53 would act as a cushioning means and as an insulation.

During a collision when the opposing vehicle's momentum is too great to be wholly absorbed by the cushioning and diverting action that has been described, the momentum of the heavy opposing vehicle will tend to push the safe vehicle laterally for a very short distance, causing the diagonal brace 44 to pivot to the position shown in FIG. 8. This causes the spike means 25f to momentarily gouge the roadway 3. The grappling hook means 27c, 28c and 25c and deformations of the contacting portions of the two vehicles will tend to lock the vehicles together, thereby tending to cause the impacted end of each vehicle to be hurled upwardly. The raising action of the opposing vehicle tends to jolt occupants of the opposing vehicle and to materially deform the opposing vehicle. The raising action would also tend to bend up the impacted end portions of both vehicles. The weight and strength of the heavier vehicle would tend to resist the upward force, therefore, the light safe vehicle will tend to tear loose by tearing off portions of the impacted end of the opposing vehicle. When the safe vehicle rises further, the opposing heavier vehicle would tend to wedge or nose under it, causing the impacted end of the safe vehicle to be pushed upwardly so that it attains a position on an upper portion of the opposing vehicle.

When the impacted portion of a safe light weight automobile body is raised by the shell 1 flattening under a collision impact against a heavy truck and the like, the safe vehicle is pushed backwards or aside by the heavy truck, thus tending to prevent the truck from riding over top of it and crushing it.

Early during a collision, the shell 1 and the ribs R are likely to be deformed to a high degree by narrow opposing bumper means, when this condition occurs, only the brace means 44 causes jacking action to raise the impacted ends of the colliding vehicles.

The shell and ribs of a door 5 can flatten under a collision impact and divert force into the roadway 3 and into lifting action. As described fully in my Patent No. 3,056,627, the door 5 has an angle iron along its bottom. The tie-posts in the door 5 are attached to the angle iron. The angle iron bears against the top of the channel 9. When the door 5 is closed, a slot in the end of the link brace engages a pin like the pin 39.

Thus the safe vehicle body can progressively cushion and divert collision impact force from another vehicle against a portion of its bumper means, by the impact flattening a portion of the shell 1 and the ribs R that are adjacent to the shell portion. The flattening spreads the shell and ribs vertically to a great extent, so the force is diverted downwardly and upwardly and so the force transmitted through the shell 1 and the ribs R, strike the roadway 3 and then cause lifting action of the impacted ends of both vehicles, as the vehicles tend to deform and lock together. Further action is caused by the diagonal stop brace means 44 gripping the roadway 3 and diverting force diagonally from the opposing vehicle's bumper into the roadway 3. Additional cushioning action is caused by the yielding that is the result of limited deformation of the colliding vehicles.

There are obviously many possible modifications of the safe vehicle body that may provide limited protection. A modification may have an end portion without a shell 1. The sheets 33 and 34 act as the shell portions of the ends of the vehicle body. Ribs R would flatten under a collision impact, causing the shoes 25b and the spikes 25f to strike the roadway 3 and to cause the impacted end of the vehicle to rise, thus absorbing force.

Other modifications may omit all or some of the yieldable ties.

Still further modifications may have the lower portion of the shell and rib means yielding to a lesser degree so they do not engage the roadway 3. Tie means may be used to limit the downward yielding.

While I have illustrated and described certain specific embodiments of my invention, it will be understood that these are by way of illustration only, and that various changes and modifications may be made.

I claim:

1. In a vehicle having a rigid frame, a yieldable bumper mounted on said frame, a stop having a stiff stop brace, said stop brace having an end portion pivotally mounted to a lower portion of said frame adjacent to and interconnected to said bumper, said stop brace extending inwardly from said pivotal mounting in a direction towards the central portion of said vehicle, said stop including tripping means to hold said stop brace in a retracted position, said tripping means releasing said brace in response to a collision impact against said bumper by a heavy vehicle, thereby causing the other end of said stop brace to pivot downwardly to a diagonal position so as to engage a roadway and divert much of said impact diagonally into said roadway, said pivotal mounting including means to allow said stop brace to pivot about its point of engagement with said roadway to cause said lower portion of said frame to rise, said bumper includes grappling hook means projecting outwardly, said grappling hook means having at least one barbed offset projecting upwardly, whereby some of the remainder of said impact is expended in forcing said vehicle to pivot upwardly, and whereby said upward pivotal movement causes said barbed offset to engage said heavy vehicle and tend to raise it while said barbed offset restrains said vehicle from moving laterally away from said heavy vehicle.

2. In a vehicle having an outer body portion including a yieldable bumper portion, a stop having a stiff stop brace, said stop brace having an end portion pivotally mounted to a lower portion of said outer body portion in close proximity to said bumper portion, said stop brace extending inwardly from said pivotal mounting in a direction towards the central portion of said vehicle, said stop including restraining means to hold said stop brace in a retracted position, means for releasing said stop brace in response to a collision impact against said bumper portion by a heavy vehicle, thereby causing said stop brace to pivot downwardly to a diagonal position that slopes downwardly and inwardly from said pivotal mounting so that the other end of said stop brace engages a roadway, said pivotal mounting being movable about a sufficient arcuate range to allow said stop brace to pivot away from said collision impact about the point of engagement of said stop brace with said roadway in response to said heavy vehicle pushing and moving said vehicle, thereby causing said outer body portion to rise, whereby much of said impact is diverted diagonally through said stop brace into said roadway, and whereby some of the remainder of said impact is expended in forcing said vehicle to pivot upwardly.

3. A combination as recited in claim 2, wherein said stop includes power means to force said stop brace to engage said roadway, whereby said brace is pivoted rapidly to a position against said roadway.

4. A combination as recited in claim 2, wherein said other end includes a sharp extremity, whereby it can penetrate the surface of said roadway.

5. A combination as recited in claim 2, wherein said other end includes a pivotally mounted friction shoe, whereby said stop brace can transmit much impact into a soft surfaced roadway.

6. A combination as recited in claim 2, wherein said restraining means includes a shear pin.

7. A combination as recited in claim 2, wherein said outer body portion includes hook means that engage the underside of front portions of said heavy vehicle when said vehicle is raised, whereby said vehicle is restrained from rising to an extent until said hook means forces at least portions of said heavy vehicle to rise.

8. A combination as recited in claim 2, wherein said yieldable bumper comprises a stiff yieldable bumper shaft means outwardly arched throughout in a vertical plane, fixed pivotal bearing means rigidly attached to said frame, said fixed pivotal bearing means pivotally engaging the upper end portion of said bumper shaft means, a yieldable bearing means mounted on said frame, said yieldable bearing means engaging the lower portion of said bumper shaft means so as to permit the lower portion of said shaft means to move downwardly away from said upper end portion and strike against the roadway surface as the result of said impact against the outer surface of said bumper shaft means which results in partial flattening of said bumper shaft means, causing said upper end portion to rise and tend to raise the adjacent portion of said vehicle away from said roadway surface, causing lifting action which absorbs much of said impact, thereby cushioning said impact, whereby said impact is progressively absorbed to prevent critical deformation of occupant's compartment.

9. A combination as recited in claim 3, wherein said power means includes spring means.

10. A combination as recited in claim 8, together with a yieldable tie means having a lower tie portion engaging said lower portion of said shaft means and an upper tie portion fixed relative to said framework so that it cannot yield with respect to said vehicle, whereby when said shaft means is flattened by said impact, some of said impact is expended in causing said yieldable tie means to yield.

11. A combination as recited in claim 8, wherein said shaft means are two shafts in spaced relationship, together with an outwardly bowed, slightly flexible panel of substantially constant radius of curvature throughout and in vertical plane extended horizontally, said bowed panel fastened to said outer surface of said shaft means, whereby said impact against said panel causes said panel to flatten to an extent as it spreads said impact into said two shafts.

12. A combination as recited in claim 8, wherein said yieldable bearing means includes pivotal link means having one end portion pivotally engaged to said frame inwardly away from said shaft means, and the other end portion pivotally engaging said lower portion, whereby when said lower portion is stressed by said impact, said link means braces said lower portion.

13. A combination as recited in claim 8, wherein said yieldable bumper includes spike means projecting downwardly from its lower extremity, whereby said spike means penetrates said roadway and restrains said vehicle from moving laterally.

References Cited

UNITED STATES PATENTS

| | | | |
|---|---|---|---|
| 1,419,366 | 6/1922 | Fial | 180—93 |
| 1,459,314 | 6/1923 | Resk | 180—93 |
| 2,066,468 | 1/1937 | Grigas | 180—93 |
| 2,232,821 | 2/1941 | Brown et al. | 188—5 |
| 2,843,224 | 7/1958 | Landman et al. | 180—93 |
| 2,845,144 | 7/1958 | Bohn | 293—2 X |
| 2,916,324 | 12/1959 | Graham | 280—150 X |
| 3,056,627 | 10/1962 | Graham | 296—28 |
| 3,349,865 | 10/1967 | Deutsch | 180—93 |
| 3,356,175 | 12/1967 | Graham | 296—28 |

FOREIGN PATENTS 592,295 9/1947 Great Britain.

KENNETH H. BETTS, Primary Examiner

U.S. Cl. X.R.

293—6, 63, 69